United States Patent

[11] 3,588,661

[72] Inventor Harold R. Newell
  South Newbury, N.H.
[21] Appl. No. 723,808
[22] Filed Apr. 24, 1968
[45] Patented June 28, 1971
[73] Assignee Mesur-Matic Electronics Corporation
  Warner, N.H.

[54] ELECTRONIC DAMPING FOR STEPPING MOTORS
  4 Claims, 4 Drawing Figs.

[52] U.S. Cl. .................................................. 318/696
[51] Int. Cl. .................................................. H02k 37/00
[50] Field of Search .................................................. 318/138
  (A), 254; 310/49

[56] References Cited
  UNITED STATES PATENTS
  3,328,658 6/1967 Thompson.................. 318/138
  3,345,547 10/1967 Dunne....................... 318/138
  3,386,018 5/1968 Smith-Vaniz................ 318/138
  3,423,658 1/1969 Barrus....................... 318/138

OTHER REFERENCES
  TRANSISTOR MANUAL, General Electric Co. 1964 pp. 320— 321, 338, 339 (copy in 211)
  PULSE, DIGITAL AND SWITCHING WAVEFORMS, Millman & Taub, McGraw Hill, N.Y. 1965 pp. 404, 405.

Primary Examiner—G. R. Simmons
Attorney—Hurvitz, Rose and Greene

ABSTRACT: Electronic damping of a stepping motor is provided to suppress the oscillatory response of the shaft at the conclusion of a step, by energizing the motor driving circuit to excite the motor phases in a forward switching sequence interrupted by a switching reversal prior to conclusion of the selected step. The precisely timed forward, reverse, forward switching produces a slowing of the shaft to effect a smooth transition between initial and final position of a step, with positive cessation of rotation upon attainment of the final position.

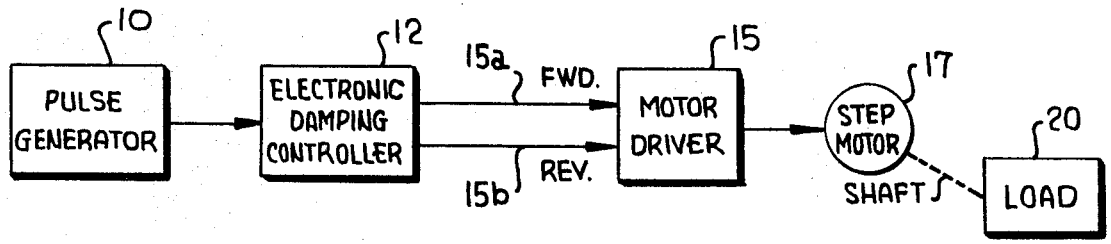
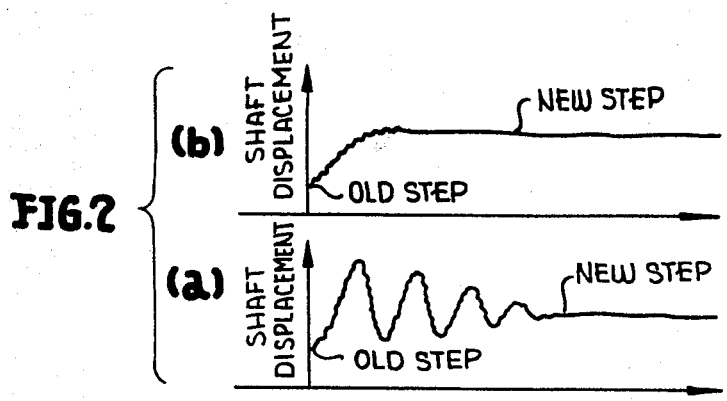
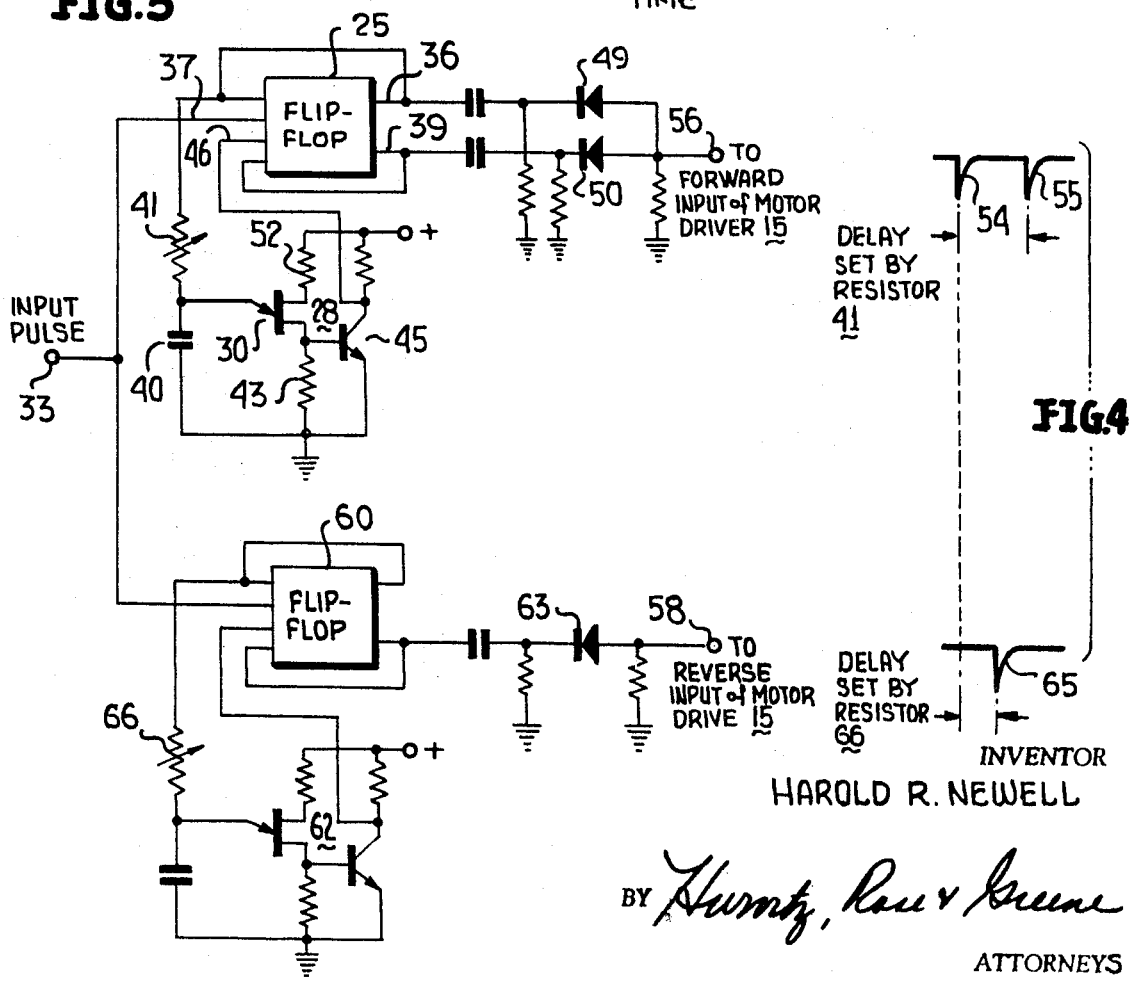
INVENTOR
HAROLD R. NEWELL
BY Hurvitz, Rose & Greene
ATTORNEYS

ELECTRONIC DAMPING FOR STEPPING MOTORS

BACKGROUND OF THE INVENTION

The present invention relates generally to stepping motors, and more particularly to methods and systems for electronically damping a multiphase synchronous or stepping motor to suppress transient response of the shaft as it attains a selected incremental position.

Multiphase incremental step motors are commonly driven by sequentially switching the supply voltage across the several motor windings in a predetermined order such that each winding is energized for a specified time interval until the shaft completes a desired stepping program. In a four-phase step motor, for example, field windings A, B, C, and D, corresponding to the phases and arranged relative to one another and to the rotor to produce, when energized, a magnetic field exerting a torque on the rotor, are normally subjected to a switching format in which driving voltage (or current) is supplied to the windings for equal time intervals in the sequence A, B, C, D, A, B, C, D, and so forth. In this manner, the motor phases are successively excited and the motor shaft undergoes discrete equiangular stepped rotation. The driving torque may be enhanced to a great extent by developing certain variations in the sequential energization or switching format of the windings, as by application of energizing current to two windings at a time according to the format A+B, B+C, C+D, D+A, A+B, and so forth.

As will presently be observed in greater detail, the motion of the shaft is usually something far less than true "step" rotation. During slow advancement of the shaft through discrete increments, a given point on the shaft undergoes step displacements, overshooting the desired final position and thence experiencing damped oscillation about that location. The time interval required for this transient response to cease, and thus for the shaft to assume a rest position, is a function of several factors; principally (a) the effective inertia of the moving elements coupled to the shaft, both within the motor structure and a part of the external load; (b) the frictional losses occurring in and as a result of these moving elements; and (c) the internal electrical damping.

It is a principal object of the present invention to provide methods and systems for inserting electrical or electronic damping functions into the driving circuit of a step motor to suppress or completely eliminate the usual damped oscillatory motion of the shaft upon stepped rotation to a desired angular position.

SUMMARY OF THE INVENTION

According to the present invention, the motor phases are excited to produce incremental rotation of the shaft, in either a clockwise or counterclockwise sense, as desired; but following initiation of each new increment of rotation a switching reversal is effected which, while not sufficiently long to stop the shaft forward rotation and produce rotation in a reverse direction, is adequate to slow the forward rotation of the shaft prior to completion of the winding energization that had effected the new increment. That is to say, during a portion of each successive step, or at other preselected timing points in the switching program, the motor phases are energized for a brief interval in a reversal of the sequence actually required to produce the desired stepping direction. This forward, reverse, forward switching or excitation is precisely timed to ensure that the shaft moves smoothly to the final position of each step or upon conclusion of a prescribed number of steps, with little or no tendency to oscillate about that position. In effect, electronic damping has been added to the system in an amount sufficient to eliminate transient response.

It is important to note that by properly timing the switching reversal, this damping is achieved without significant power loss. Rather, greater efficiency may be obtained because of the suppression or elimination of overshoot and backlash.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings, in which:

FIG. 1 is a block diagram of a generalized step motor control system incorporating an electronic damping controller according to the invention;

FIGS. 2(a) and 2(b) are plots or graphs of angular displacement of stepping motor shaft versus time, illustrating the shaft response in stepping motors without and with the electronic damping of the present invention; respectively;

FIG. 3 is a circuit diagram of a preferred embodiment of the electronic damping controller in the system of FIG. 1; and FIG. 4 is a graph illustrating the timing of output pulses in the circuit of FIG. 3.

DESCRIPTION OF A PREFERRED EMBODIMENT

Referring now to FIG. 1, a suitable control system for a stepping motor may include a source of pulses, such as generator 10, an electronic damping controller 12, of which more will be said later, and which responds to the pulse train emanating from generator 10 to supply a programmed and accurately timed set of pulses to a motor driving circuit 15. The motor driver may be of any conventional type, but for the sake of convenience and clarity in the subsequent description of an embodiment of damping controller 12, driver 15 will hereinafter be considered an assembly of switching circuits responsive to incoming pulses at "forward" terminal 15a to undergo sequential activation by which to normally excite the field windings (phases) of multiphase step motor 17 in the two-winding per energization-interval format described earlier (i.e., A+B, B+C, C+D, D+A, et cetera). Driver 15 also has a "reverse" or "counterclockwise" input terminal 15b coupled to receive "reverse" pulses from damping controller 12. Stepped rotation or incremental angular displacement, of the shaft of motor 17 is achieved in response to application of winding excitation pulses to the motor from the driver, and results in appropriate movement of a load 20 coupled to the shaft.

Except for the presence of electronic damping controller 12, the motor control system of FIG. 1 is completely conventional. The system may also contain a pulse programmer of the type shown in my copending U.S. application Ser. No. 610,426, entitled "Pulse Programmers for Step Motors," of
 a source of a train of control pulses;
 a first monostable flip-flop; common assignee, for modifying the initial and final rate at which pulses are supplied to the driving circuitry of the step motor.

Referring now to FIG. 2(a), in the absence of damping, when the stepping motor shaft is advanced relatively slowly in discrete increments, i.e., a step at a time, the the shaft overshoots the desired "target" position upon movement from initial to final position. Prior to initiation of the next step, the shaft reverses its direction back toward the target position, again overshooting the mark but by a smaller displacement than before. This nonforced or transient response continues in the form of a damped oscillatory motion, recognizable in FIG. 2(a) as the damped sinusoid whose amplitude asymptotically approaches the level representative of the target position. As the waveform clearly indicates, the shaft response is not a positive stepped rotation, being degraded by the damped oscillatory motion occurring at the conclusion of each stepping interval. If the shaft advancement is carried out at a sufficiently rapid driving rate, the shaft may not achieve the target position before a new step is initiated, and in that instance will begin the next increment from a position of undershoot or overshoot. Nevertheless, some damped oscillatory motion occurs even for very rapid driving rates, and in every case is objectionable.

Before considering the waveform shown in FIG. 2(b), attention is directed to a preferred embodiment of the electronic damping controller 12, as shown in FIG. 3. Referring to the latter FIG., flip-flop 25 is connected to an oscillator 28 containing unijunction transistor 30. As is well known, the unijunction is a semiconductor device having a single emitter electrode and a pair of base electrodes, and exhibiting a negative resistance characteristic.

Initially, with no pulse applied at input terminal 33, flip-flop 25 is in a stage in which the output terminal feeding lead 36 is "low," e.g., has a negative voltage thereon. Since oscillator 28 receives its actuating voltage from this output terminal of flip-flop 25, it is presently inactive. Upon application of an input pulse from generator 10 (FIG. 1) to terminal 33 of damping controller 12, and thus to input lead 37 of flip-flop 25, the flip-flop is switched to the stable state in which the output terminal feeding lead 39 goes "low," while the other output terminal, feeding lead 36, goes "high," (e.g., assumes a relatively large positive voltage). Under these conditions, capacitor 40 of oscillator 28 begins to charge at a rate determined by the resistance value of variable resistor 41. When the capacitor charges to a voltage value exceeding the bias voltage developed at the emitter junction as a result of the positive voltage on one base electrode and the ground potential on the other, the unijunction transistor 30 is triggered to the high current conduction state. Capacitor 40 is thereby discharged through the emitter-base path of unijunction 30 connected to resistor 43, and the base-to-emitter bias voltage on transistor 45 is raised to the saturation level. Accordingly, the collector of the latter transistor falls rapidly to the voltage value applied to the emitter, i.e., to ground potential. This sharp voltage discontinuity appears at input lead 46 of flip-flop 25, triggering the flip-flop to its other stable state in which output lead 36 again goes "low," and oscillator 28 reverts to the inactive condition.

Diodes 49 and 50, together with associated capacitors and resistors, form an OR gate for converting the negative-going excursions of voltage at the output terminals of flip-flop 25 to negative pulses (FIG. 4) to be applied to the forward input of motor driver 15. In essence, the single input pulse applied to terminal 33 of the damping controller is converted to a pair of output pulses separated by a time interval governed by the RC time constant of resistor 41 and capacitor 40 as required to charge the capacitor to the value of the trigger voltage for unijunction transistor 30. Since capacitor 40 is fixed and resistor 41 is variable, the time interval is effectively set by adjustment of the resistance value of resistor 41. The initial output pulse substantially coincides in time with the occurrence of the input pulse.

The stability of oscillator 28 is controlled primarily by resistors 41 and 52 and capacitor 40.

A pulse occurring during the time interval between the pair of pulses deriving from the damping controller at output terminal 56, is obtained at a further output terminal 58 in response to the operation of a flip-flop cooperating with a unijunction oscillator in a circuit similar to that described immediately above. In particular, flip-flop 60 is also responsive to an input pulse appearing at terminal 33 to activate an oscillator 62. However, it will be observed that this output of the flip-flop is not supplied to a circuit output terminal; rather, only the change in state of the flip-flop that is produced upon triggering the unijunction is utilized to provide a negative pulse at output terminal 58, via diode 63 and associated capacitor and resistances. The time interval between this pulse 65 (FIG. 4) at terminal 58 and pulse 54 at terminal 56 is set by the value to which variable resistor 66 is adjusted.

In operation of damping controller 12, an input pulse at terminal 33 initiates an output pulse 54 which is applied to the "-forward" input of motor driver 15. If it is assumed that motor phases A and B had previously been energized, this pulse causes the driver to energize phase C, turning off phase A, while phase B remains on. Thus, B and C are now energized to produce incremental forward advancement of the motor shaft toward a new position. After a preselected time interval (set by adjustment of resistor 66), a pulse 65 is applied to the "reverse" input of motor driver 15, thereby deenergizing phase C and turning phase A back on concurrently with phase B. The result is a slowing of the motor shaft, but there is no reversal of the direction of shaft rotation since shortly thereafter, at a time selected by the adjusted value of resistor 41, another pulse, 55, is applied to the "forward" input of driver 15. At that point, phase C is turned on as phase A is turned off, phase B remaining energized. This overall forward, reverse, forward switching in response to each output pulse supplied by generator 10 produces a cancellation or suppression of the tendency of the shaft to oscillate about the final position, and results in the smooth movement of the shaft to that position. This is shown by the displacement-versus-time diagram of FIG. 2(b), which is to be compared with the waveform of FIG. 2(a) representing shaft movement between steps in the absence of the damping provided by the present invention.

While I have disclosed a preferred embodiment of my invention, it will be apparent that variation of the details of construction which have been illustrated and described may be resorted to by the exercise of ordinary skill following a consideration of the forgoing specification, without departing from the spirit and scope of the invention, as defined in the appended claims.

I claim:

1. A control circuit for a step motor, said step motor having a load shaft rotated step-wise by said step motor, comprising:

a source of a train of control pulses;

means responsive to each of said control pulses for generating a first impulsive step motor drive pulse of one polarity coincident with each of said control pulses, followed by a second impulsive step motor drive pulse, followed by a third impulsive step motor drive pulse of said one polarity, said drive pulses occurring in the interval inclusive of a first of an adjacent pair of control pulses and terminating before the second pulse of said pair;

means applying said step motor drive pulses in such driving relation to said step motor that said first and third drive pulses accelerate and said second pulse decelerates said step motor;

separate R–C timing circuits for respectively timing each of said second and third drive pulses directly, from each of said control pulses taken as a zero reference time, wherein is included differentiating means for developing each of said impulsive pulses as a transient sharp fall and slower rise of waveform.

2. A control circuit for a step motor, comprising:

a source of a control pulse;

means including differentiating circuitry and responsive to said control pulse for generating a train of drive impulsive pulses;

one of said train of drive pulses occurring substantially concurrently with said control pulse and connected to accelerate said step motor in a first direction;

a second of said train of drive pulses following said one of said train of drive pulses being connected to said motor and timed to decelerate said step motor sufficiently to eliminate oscillations produced in said step motor in response to said one of said train of drive pulses;

a third of said train of drive pulses following said second of said train of drive pulses being connected to said motor to reaccelerate said step motor; and two R–C timing circuits for respectively independently timing each of said second and third of said train of drive pulses separately with respect to said control pulse taken as a zero reference time solely by controllably delaying said control pulse.

3. In a control circuit for a step motor driven incrementally by control pulses:

a first monostable flip-flop;

a second monostable flip-flop;

means responsive to each of said control pulses for setting the states of said flip-flops from a first to a second state;

each of said flip-flops including a delay circuit for timing reset;

means responsive to both set and reset of said first monostable flip-flop for generating drive pulses for driving said step motor in an accelerating direction; and means responsive only to the reset of said second flip-flop for generating a drive pulse for driving said step motor in a decelerating direction impulsively at a time between set and reset of said first flip-flop.

4. The combination to claim 3, wherein each of said monostable flip-flops includes a bistable flip-flop set by each timing pulse and a timing circuit for resetting said flip-flop after a predetermined time elapse.